Oct. 29, 1929.  F. A. TEFFT  1,733,840
TERMINAL BOX SUPPORT
Original Filed Nov. 3, 1924
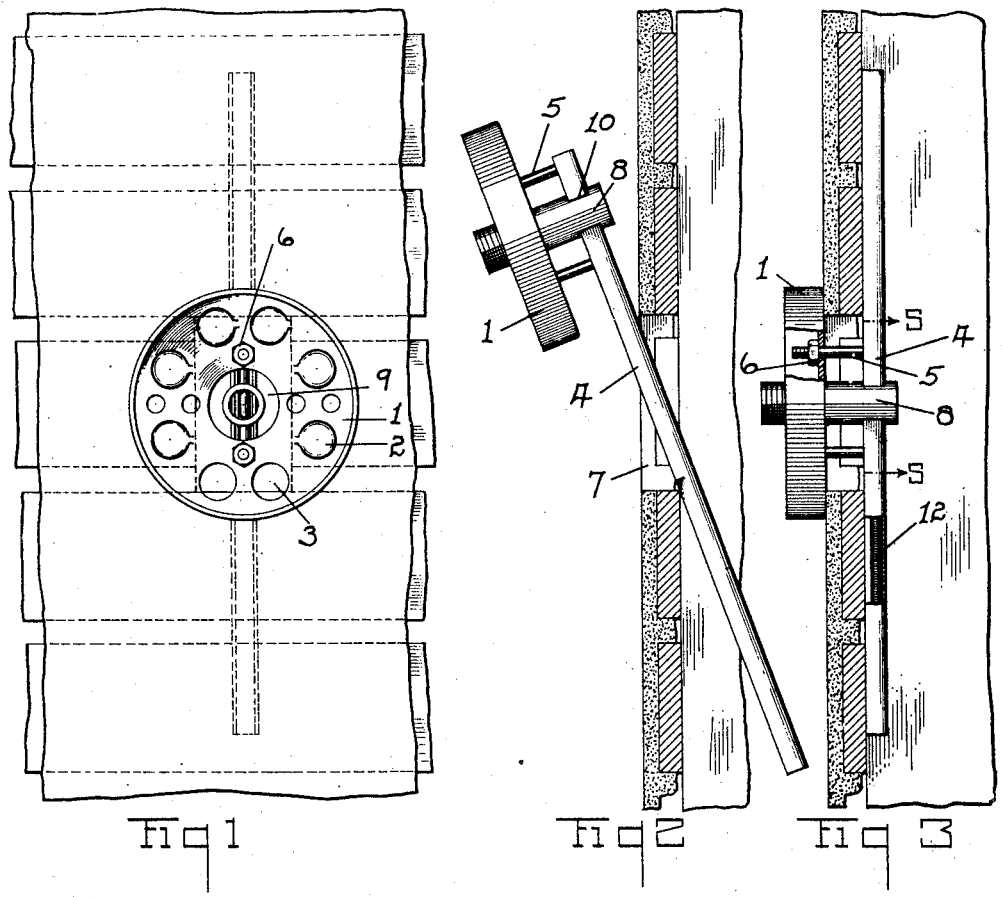
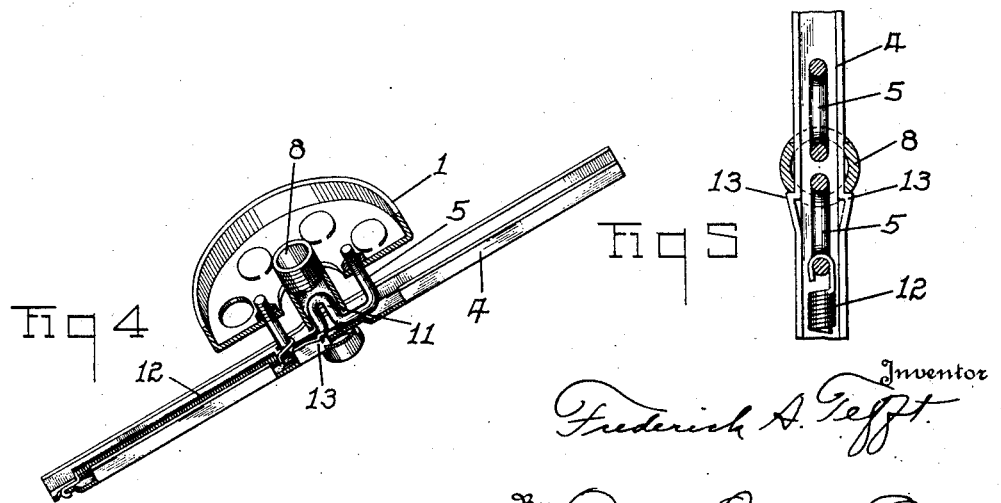

Patented Oct. 29, 1929

1,733,840

UNITED STATES PATENT OFFICE

FREDERICK A. TEFFT, OF TOLEDO, OHIO

TERMINAL-BOX SUPPORT

Application filed November 3, 1924, Serial No. 747,412. Renewed April 1, 1929.

The invention particularly has for its object to provide a means whereby a terminal box may be readily secured in a completed or finished wall without tearing out a portion thereof to form a hole larger than the terminal box, and so that the opening that is formed will not be exposed when the box is secured in position.

The invention may be contained in terminal box supports of different forms. To present a practical application I have selected a terminal box support as an example of structures that contain the invention. The terminal box support selected is shown in the accompanying drawings and shall be described hereinafter.

Figure 1 of the drawings illustrates a front view of a terminal box or terminal plate secured in position in a finished wall having a lath and plaster lining. Figure 2 illustrates the manner in which the box retaining means may be inserted in position within the plaster and lath lining of the wall. Figure 3 is a side view of the terminal box or terminal plate support shown in Figs. 1 and 2. Figure 4 is a perspective and fragmentary view and in part a sectional view of the terminal box or plate and the support. Figure 5 is a view of a section taken on the line 5—5 indicated in Fig. 3, the dimensions of the view of Fig. 5 being slightly larger than the dimensions used in producing Fig. 3.

Terminal boxes of the type referred to necessarily are located between the studdings or beams to properly position the connecting wires and the boxes consequently must be secured to the wall linings, such as the lath, at points located between the studdings or beams. In order to secure the terminal boxes on walls, that is, side walls or ceilings, without disfiguring exposed portions of the wall, openings are formed smaller than the sizes of the terminal boxes, through which the electric wires and their insulating looms extend. The boxes are secured by a suitable means to the lath or the plaster of the wall. Considerable difficulty is met in fixedly securing the terminal box to the wall, particularly in view of the fact that the lath has to be sawed or otherwise cut, which weakens it for the retention of the terminal box in position. In the construction embodying my invention I have provided a bar that is connected to the terminal box in such a way that the bar may be shifted relative to the terminal box and then inserted in the opening formed to receive the wires, and when within the lining of the wall it may be easily shifted relative to the terminal box so as to place the terminal box in a central position with respect to the bar. The wall lining may then be clamped by a threaded means between the bar and the back of the terminal box or plate.

The terminal box or plate 1, shown in the drawings, is provided with the usual scored or partially cut "knockouts" 2 that may be removed to form openings such as the openings 3 in the manner well known in the art, through which the wires may be passed to connect to a chandelier or other electrical translating device that is connected through the terminal box or plate to a source of supply of an electric current. A cross bar 4 is connected to the plate 1 by a means that may be operated to clamp the wall lining between the cross bar 4 and the back of the plate. In the form shown, the connecting member 5 is in the form of a U that extends from the cross bar 4 through the back of the plate 1. The legs of the U being threaded, the nuts 6 may be threaded thereon to draw the bar 4 relative to the plate 1, whereby the lining of the wall may be readily clamped between the plate and the bar 4.

In order that the bar 4 may be inserted in an opening such as the opening 7 that may be cut into the lining of the wall, it is shiftably connected with the terminal plate 1. In the form of construction shown, the cross bar 4 is a channeled bar in which one end of the U-member 5 is located and within which it may slide. The terminal boxes are usually provided with threaded studs for connecting the supporting arms of the chandeliers. In the form of construction shown, the stud 8 extends through an opening 9 formed in the terminal plate and is slidably connected to the bar 4. The stud 8 is provided with an opening or openings 10 for receiving the bar 4 and so that the bar 4 may slide within the opening 10 and thus slide with reference to the terminal plate 1. The U-member 5 is located within the channeled bar and also extends through the opening 10, and so that when the nuts 6 are threaded on to the legs of the U-member, the U-member will draw on the stud 8, which in turn will draw on the cross bar 4.

In order to retain the U-member 5 in position relative to the stud 8, notwithstanding the sliding movements of the cross bar 4 relative to the stud 8, the U-member is provided with an outwardly extending loop or bend 11 that enters the stud 8, the stud 8 being made hollow. Thus the stud 8 and the U-member 5 will be held in fixed relation relative to each other when they are placed in position on the cross bar 4.

Considerable difficulty is experienced when it is attempted to move the cross bar relative to the terminal plate when the cross bar has been placed within the wall lining. In order to overcome this difficulty and in order to enable ready and quick placement of the cross bar in position, a means is provided for causing the cross bar to be shifted relative to the plate when it has been located within the wall lining. In the form of construction shown, a spring 12 is connected to the plate and to the cross bar and when the cross bar is shifted relative to the plate to position the plate at one end of the cross bar for the purpose of inserting the cross bar through the opening formed in the wall lining, the spring 12 is placed under tension. The terminal box or plate 1 is drawn against the tension of the spring 12 to one end of the bar where it is held by the finger pressed against the end of the bar, the other end of the bar is then inserted in the opening formed in the wall and pushed along until the finger is inserted in the opening whereupon the finger is withdrawn releasing the bar so that the spring is permitted to shift the bar relative to the plate and so locate the bar relative to the opening and to the plate, that the ends of the bar will extend on either side of the plate and within the wall and so that a part of the wall may be clamped between the plate and the bar. The conduits are inserted through the openings that are formed by knocking out parts of the plate. This is preferably done before the plate is clamped in position to the wall. When, therefore, the cross bar has been placed in position within the lining, the end of the cross bar may be released and the spring will cause the cross bar to be shifted relative to the plate so as to place the plate in a central position relative to the cross bar. The nuts 6 may then be rotated on the legs of the U and the lining may be clamped between the plate and the cross bar. In the form of construction shown, the spring 12 is connected to one of the legs of the U-member 5 and to the end of the cross bar and in order to limit the movement of the cross bar when its end is released to permit the spring to shift the cross bar into a relatively central position, the cross bar is provided with a stop that will engage one of the parts that are connected to the terminal plate, as for instance, the cross bar may be provided with the raised portions 13 that will engage the edges of the openings 10 that are formed in the stud 8 and thus limit the sliding movement of the cross bar that is produced by the resiliency of the spring 12.

I claim:

1. In a terminal wall box support, a cross bar, a member for connecting the cross bar to the terminal box, said member including means for slidably connecting the cross bar to the member, a spring for shifting the cross bar relative to the member, means for securing one end of the spring to the member, means for securing the other end of the spring to the bar substantially at one end of the bar, and means substantially at the center of the bar for limiting the movement of the bar relative to the member.

2. In a terminal wall box support, a cross bar, a member for connecting the cross bar to the terminal box, said member including means for slidably connecting the cross bar to the member, a spring for shifting the cross bar relative to the member, means for securing one end of the spring to the member, means for securing the other end of the spring to the bar substantially at one end of the bar, and means substantially at the center of the bar for limiting the movement of the bar relative to the member, and means for drawing the bar and the plate towards each other to clamp a part of the wall located between the bar and the plate.

In testimony whereof I have hereunto signed my name to this specification.

FREDERICK A. TEFFT.